(12) United States Patent
Sprigade et al.

(10) Patent No.: US 11,622,504 B2
(45) Date of Patent: Apr. 11, 2023

(54) AGRICULTURAL PRODUCTION MACHINE

(71) Applicant: CLAAS Selbstfahrende Erntemaschinen GmbH, Harsewinkel (DE)

(72) Inventors: Daniel Sprigade, Unna (DE); Fabian Wohlfahrt, Harsewinkel (DE); Markus Koch, Saerbeck (DE); Philipp Heymann, Möhnesee Wamel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 16 days.

(21) Appl. No.: 17/306,437

(22) Filed: May 3, 2021

(65) Prior Publication Data

US 2021/0345546 A1 Nov. 11, 2021

(30) Foreign Application Priority Data

May 7, 2020 (DE) .......................... 102020112433.3

(51) Int. Cl.
*F02D 31/00* (2006.01)
*A01D 41/12* (2006.01)
*A01D 41/127* (2006.01)

(52) U.S. Cl.
CPC ....... *A01D 41/1274* (2013.01); *F02D 31/001* (2013.01); *F02D 2200/50* (2013.01)

(58) Field of Classification Search
CPC .... F02D 31/00; F02D 31/001; F02D 2200/50; A01D 41/12; A01D 41/1247; A01D 69/02; A01D 69/025
See application file for complete search history.

(56) References Cited

U.S. PATENT DOCUMENTS

| 5,488,817 A | 2/1996 | Paquet et al. |
| 2005/0178100 A1 | 8/2005 | Deppe |

(Continued)

FOREIGN PATENT DOCUMENTS

| DE | 10349562 A1 | 6/2005 |
| EP | 0631906 A1 | 1/1995 |

(Continued)

OTHER PUBLICATIONS

European search report for European application No. 21156576.7-1005 dated Sep. 14, 2021.

*Primary Examiner* — John Kwon
*Assistant Examiner* — Johnny H Hoang
(74) *Attorney, Agent, or Firm* — Lempia Summerfield Katz LLC

(57) ABSTRACT

An agricultural production machine, such as a combine, forage harvester or tractor, is disclosed. The agricultural production machine includes a drive assembly with an internal combustion engine, an electric energy supplying system having an electric auxiliary machine, and a driver assistance system with a control system that is configured to control the internal combustion engine, the electric auxiliary machine, and at least one power consumer that can be driven by the drive assembly. The internal combustion engine operates at the lowest possible rotational speed, with the electric energy supplying system configured to support the internal combustion engine by connecting the electric auxiliary machine at this lowest possible rotational speed when connecting a load.

18 Claims, 2 Drawing Sheets

(56) References Cited

U.S. PATENT DOCUMENTS

| | | | | |
|---|---|---|---|---|
| 2010/0293911 A1* | 11/2010 | Mackin | ................ | A01D 69/025 |
| | | | | 56/10.2 G |
| 2011/0035136 A1* | 2/2011 | Niimi | .................. | F02D 41/0275 |
| | | | | 60/277 |
| 2016/0046278 A1* | 2/2016 | Matsuzaki | ............ | B60W 10/08 |
| | | | | 903/930 |

FOREIGN PATENT DOCUMENTS

| | | | |
|---|---|---|---|
| EP | 1563724 | A1 | 8/2005 |
| EP | 2359676 | A1 | 8/2011 |
| EP | 3300584 | A1 | 4/2018 |
| EP | 3527353 | A2 | 8/2019 |

* cited by examiner

AGRICULTURAL PRODUCTION MACHINE

CROSS REFERENCE TO RELATED APPLICATION

This application claims priority under 35 U.S.C. § 119 to German Patent Application No. DE 102020112433.3 filed May 7, 2020, the entire disclosure of which is hereby incorporated by reference herein.

TECHNICAL FIELD

The present invention relates to an agricultural production machine that includes a control system configured to control an internal combustion engine, an electric auxiliary machine, and at least one power consumer that can be driven by the drive assembly.

BACKGROUND

An agricultural production machine may comprise any form of agricultural work vehicle that includes its own drive (e.g., a drive axle, such as with drive wheels or a crawler chassis). Merely by way of example, agricultural production machines may comprise combines, forage harvesters or tractors, possibly with attachments such as manure spreaders, sowing machines, spray devices, tedders, hay rakes, etc.

In the technical field of agriculture, various processes of an agricultural production machine run automated or partially automated, including inter alia the operation and controlling of a majority of the work assemblies of the production machine. A work assembly may comprise a system component of the production machine that supports or performs agricultural work and thereby consumes power. In addition to the aforementioned attachments, various types of work assemblies include, for example, a reel, cutting unit, threshing system, conveying devices (e.g., screw conveyor or conveyor belt), linkages (e.g., front or rear linkage), etc. All of these consumer power.

During the combine's operation through a field, its reel and cutting unit, for example, are operated. Moreover, the cut material is transported by screw conveyors and conveyor belts through a feeder housing, wherein the cut material also passes through a threshing system. The individual power consumers are automatically connected or disconnected as needed. For example, when a combine operates in a field, a front linkage with a reel and cutting unit arranged thereupon is lowered, and the reel, cutting unit, screw conveyors and conveyor belts as well as the threshing system are turned on. When driving out of the crop or when turning around, the reel, cutting unit, screw conveyors, conveyor belts, and threshing unit may be turned off, and the front linkage with the reel and cutting unit arrange thereupon is lifted.

The agricultural production machines at issue typically have an internal combustion engine, such as a diesel engine, as a common drive for the work assemblies and the drive. A fuel tank serves the internal combustion engine as a single energy store.

In addition to an internal combustion engine, also termed a primary drive and which may be operated as a main machine, agricultural production machines may also have a separate, electrical auxiliary machine (e-machine). Generally, these are exclusively for allowing the driver of the agricultural production machine to briefly increase the system output by the performance of the electric machine (in a so-called boost operation). A battery for example may serve the electric auxiliary machine as the electric energy store.

A hybrid system is also known in which an electric auxiliary machine offsets load fluctuations caused by differences in the crop density. When there is a sudden rise in the load due to an increase in the density of the crop, the electric auxiliary machine immediately provides additional power, whereby the rotational speed of an output shaft of the internal combustion engine is kept largely constant.

EP 0 631 906 A1 also describes reducing the rotational speed of an agricultural production machine whose drive concept is based exclusively on an internal combustion engine while a harvesting process is being performed before a work assembly, such as the threshing system, is connected in order to reduce the load on the drive belts while connecting the work assembly.

With this background, it may be a challenge to conserve as much fuel as possible when operating an agricultural production machine.

DESCRIPTION OF THE FIGURES

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
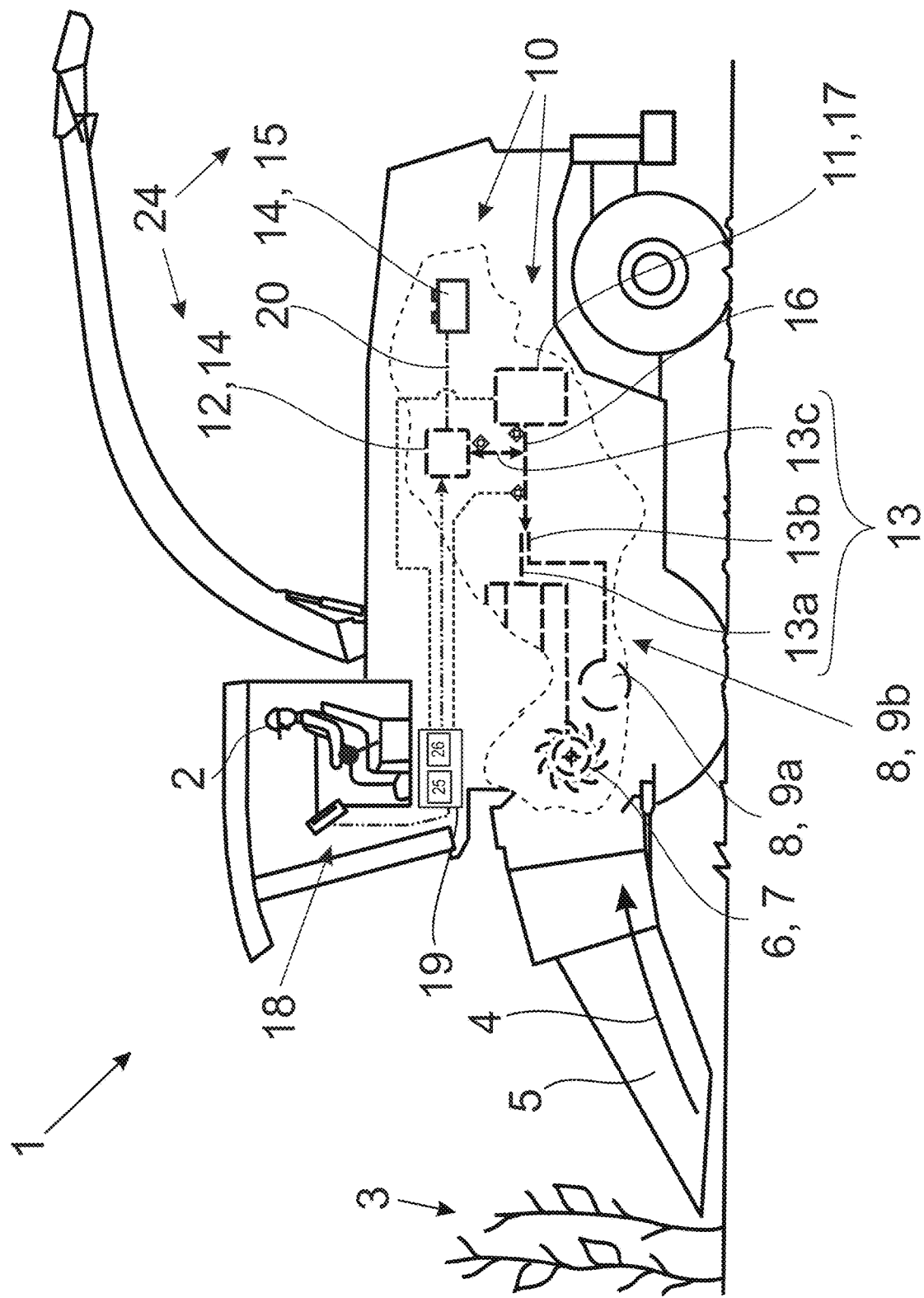
FIG. 1 shows a schematic side view of an agricultural production machine.
Figure 2:
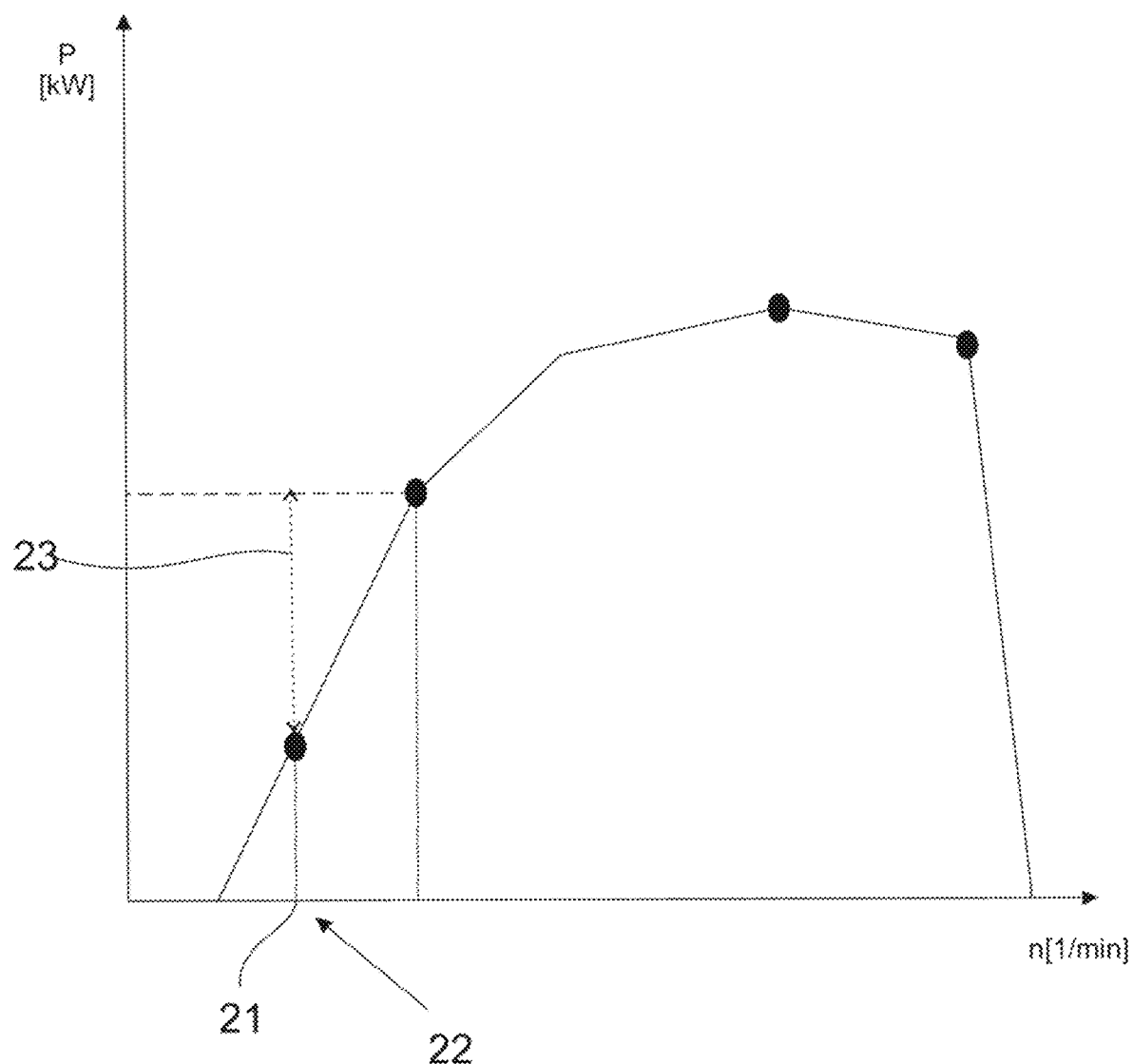
FIG. 2 shows a schematic representation of the performance of the agricultural production machine depending on the rotational speed.

In one or some embodiments, an agricultural production machine is configured to achieve further improvement or optimization, such as fuel improvement or optimization.

In one or some embodiments, an agricultural production machine, such as a combine, forage harvester or tractor, is disclosed. The agricultural production machine includes a drive assembly with an internal combustion engine, and with an electric energy supplying system having an electric auxiliary machine. The agricultural production machine further includes a driver assistance system with a control system that is configured to control one or both of the internal combustion engine or the electric auxiliary machine and at least one power consumer that configured to be driven by the drive assembly. The internal combustion engine may be operated at the lowest possible rotational speed, that this lowest possible rotational speed may be set for the electric energy supplying system as a target value. Further, the electric energy supplying system is configured to support the internal combustion engine by connecting the electric auxiliary machine at this lowest possible rotational speed during one or more predetermined operations of the agricultural production machine, such as when the agricultural production machine is connecting a load (e.g., responsive to the agricultural production machine identifying a connection with a load).

Various connections to a load are contemplated. As one example, the connection of the load is an engagement of the process drive, such that the engagement of the process drive may be realized by a tightening of a drive belt between a driveshaft of the internal combustion engine and the process drive, or by an engagement between a driveshaft of the internal combustion engine and the process drive using a clutch.

Further, in one or some embodiments, the connection of the load may comprise a connection of the drive, a starting of the agricultural production machine, or an actuation of emptying the grain tank of the agricultural production machine.

In a specific embodiment, the connection of the load may occur when performing an agricultural work order, such as when the agricultural production machine is processing the headland sequence, or at a standstill with an engaged process drive.

Thus, one consideration in reducing the fuel consumption of an agricultural production machine is by reducing the rotational speed of the internal combustion engine in certain situations when there is no significant load (e.g., reducing the rotational speed to the lowest possible rotational speed of the internal combustion engine without stalling), and therefore to a value significantly below the normal idling rotational speed of agricultural production machines.

In one or some embodiments, the lowest possible rotational speed is defined as the minimum rotational speed of the output shaft, such as the crankshaft, of the internal combustion engine at which the internal combustion engine may be kept operating without running rough or dying and/or stalling, and without emitting any significant effective power. In one or some embodiments, the lowest possible rotational speed is at most 1200 rpm, alternatively at most 900 rpm, still alternatively at most 700 rpm, yet alternatively at most 650 rpm, still alternatively at most 620 rpm. In this regard, the lowest possible rotational speed may be defined in different ways. For example, the so-called "lowest possible rotational speed" is, according to https://de.wikipedia.org/wiki/Leerlauf, between 700 rpm and 900 rpm for most engines of motor vehicles. With agricultural production machines, this is typically even lower, such as 600 rpm. Since the internal combustion engine stops the rotational speed while idling and does not run rough, the rotational speed while idling (the idling rotational speed) may be significantly above the lowest possible rotational speed of for example at least or approximately 800 rpm for tractors, and for example at least or approximately 1200 rpm for combines. This constitutes an enormous potential savings of fuel.

To prevent the internal combustion engine from running roughly or even dying and/or stalling when connecting a load, for example when engaging the process drive of the agricultural production machine, the control system of the driver assistance system is configured to control the electrical auxiliary machine, such as to control the electrical auxiliary machine in order for the agricultural production machine to use the electrical auxiliary machine when connecting a load in order to support the internal combustion engine. In this manner, the internal combustion engine may still be operated constantly or consistently at the lowest possible rotational speed (e.g., no significant (or any) change in the rotational speed of the internal combustion engine immediately before, during, and after connecting a load. In previous solutions, the internal combustion engine operates at a much higher rotational speed as the idling rotational speed, for example the aforementioned 1200 rpm to prevent the internal combustion engine from running roughly or even dying. Such a high rotational speed also causes a significant additional load on the process drives and an acoustically unpleasant perception by the driver, which may also be avoided by the disclosed agricultural production machine.

In particular, in one or some embodiments, the internal combustion engine may be operated at a lower rotational speed, such as at the lowest possible rotational speed. In one or some embodiments, this lower rotational speed (or lowest possible rotational speed) may be set as a target value or a trigger (e.g., the lower rotational speed (or lowest possible rotational speed) may be set at the control system). In particular, the control system (responsive to commanding or identifying the internal combustion engine being operated at the lower (or lowest) rotational speed, may determine whether an action is to be or is being performed (e.g., connecting the load) that without an increase in the rotational speed of the internal combustion engine or supplementing power may cause the internal combustion engine to run roughly or die/stall. Responsive to that determination, the control system may control at least one aspect of the electrical energy supplying system so that the electrical energy supplying system is configured to support the internal combustion engine when connecting the load by connecting the electrical auxiliary machine at this lower rotational speed (or lowest possible rotational speed). Thus, at least one control system (such as at least one control system resident in the driver assistance system) may control one or more motive forces, such as one or both of the internal combustion engine or the electrical auxiliary machine in order to perform any one, any combination, or all of: (i) responsive to identifying that the internal combustion engine may reduce its rotational speed (e.g., when there is no significant load), control the internal combustion engine so that the internal combustion engine is operated at the lower rotational speed (e.g., at the lowest possible rotational speed); (ii) identify an increase in load (e.g., identify a connection to a load); and (iii) responsive to identifying an increase in load, control the electrical auxiliary machine in order for the agricultural production machine to use the electrical auxiliary machine when connecting a load in order to support the internal combustion engine while still maintaining the lower rotational speed (or the lowest possible rotational speed) of the internal combustion engine.

Referring to the figures, FIG. 1 illustrates an example agricultural production machine 1, which comprises a forage harvester and is used merely as an example of an agricultural production machine. The following discussion relates to a forage harvester; however, the discussion may likewise apply to some or all other types of agricultural production machines 1, such as combines or tractors.

The agricultural production machine 1 designed as a forage harvester that may be manually driven and may, with a driver 2 in a manual work mode and self-propelled in an automatic mode, be driven through a crop 3, such as a cornfield. A flow of material 4 comprising (or consisting of) plant parts is drawn in during operation through a feeder housing 5 and guided to a power consumer 6, in this case a work assembly 7 in the form of a cutterhead, for the purposes of further comminution. Another power consumer 8 forms a drive 9a with a drive axle for drive wheels. In this regard, various power consumers are contemplated.

Moreover, the agricultural production machine 1 includes a drive assembly 10 that has on the one hand an internal combustion engine 11 as a main machine, such as a diesel engine, and on the other hand an electric auxiliary machine 12, such as an electric machine. The drive assembly 10 serves both to drive the drive 9a as well as to drive various work assemblies 7 at the same time as driving the drive 9a, in particular by a process drive 9b, also termed a main drive. The main machine and electric machine therefore may work together like a hybrid drive system.

In this regard, a drivetrain 13 proceeding from the internal combustion engine 11 is provided as a component of the drive assembly 10 and serves to route drive power from the internal combustion engine 11 to the power consumers 6 and 8. In one or some embodiments, the drivetrain 13 has three partial drivetrains 13a, 13b and 13c into which it is divided. The electric auxiliary machine 12 is coupled to the drivetrain 13, for example via a transmission (not shown).

In one or some embodiments, the first partial drivetrain 13a is configured to transmit drive power from the internal combustion engine 11 to the at least one work assembly 7 (for example a cutterhead), such as via the process drive 9b. In one or some embodiments, the second partial drivetrain 13b is configured to transmit drive power from the internal combustion engine 11 to the drive 9a. In such a case, the third partial drivetrain 13c is configured to alternately exchange drive power between the internal combustion engine 11 and the electric auxiliary machine 12.

The electric auxiliary machine 12, which in one or some embodiments may be designed as an electric machine, is a component of an electric energy supplying system 14 of the hybrid system that has an electric energy store 15 connected, in this case electrically, to the electric auxiliary machine 12. The electric auxiliary machine 12 in the disclosed embodiment may be operated as an electric generator if excess power from the internal combustion engine 11 is available. In particular, the electric auxiliary machine 12 may, however, support the drivetrain 13 (e.g., with additional torque) if the rotational speed of an driveshaft 16 of the internal combustion engine 11 threatens, is determined, or is predicted to drop due to a rise in the power requirement of the work assembly 7. "Support" may come in one or more forms. As one example, support may comprise the electric auxiliary machine 12 generating additional torque so that the torque generated by the internal combustion engine 11 and the torque generated by the electric auxiliary machine 12 are combined in the driveshaft 16.

The driveshaft 16 may comprise a shaft connected to the internal combustion engine 11 to which torque is transmitted by the internal combustion engine 11 and, if applicable, the electric auxiliary machine 12, and through which the at least one drive 9a and the work assembly 7 (via the process drive 9b) may be driven. The driveshaft 16 may either be the output shaft of the internal combustion engine 11 or a transmission output shaft of a transmission 17 downstream from the internal combustion engine 11 in the drivetrain.

The agricultural production machine 1 also has a driver assistance system 18 with a control system 19 or a so-called right-of-way controller that is configured to control any one, any combination, or all of the internal combustion engine 11, the electric auxiliary machine 12 and the drive 9a. The control system 19 may comprise any type of computing functionality, such as at least one processor 25 (which may comprise a microprocessor, controller, PLA, or the like) and at least one memory 26. The one or more memories may comprise any type of storage device (e.g., any type of memory). Though the processor 25 and memory 26 are depicted as separate elements, they may be part of a single machine, which includes a microprocessor (or other type of controller) and a memory.

The processor 25 and memory 26 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

As discussed in more detail below, the control system 19 may control any one, any combination, or all of the internal combustion engine 11, the electric auxiliary machine 12 and the drive 9a in order to perform any one, any combination, or all of: (i) responsive to identifying that the internal combustion engine may reduce its rotational speed, control the internal combustion engine so that internal combustion engine is operated at the lower rotational speed (e.g., at the lowest possible rotational speed); (ii) identify an increase in load (e.g., when connecting a load); and (iii) responsive to identifying an increase in load, control the electrical auxiliary machine in order for the agricultural production machine to use the electrical auxiliary machine when connecting a load in order to support the internal combustion engine (e.g., supplement the power supplied by the internal combustion engine by activating the electric auxiliary machine 12 and the drive 9a) while still maintaining the lower rotational speed (or the lowest possible rotational speed) of the internal combustion engine.

In one or some embodiments, an agricultural production machine 1, such as a combine, forage harvester or tractor, wherein the agricultural production machine 1 has a drive assembly 10 with an internal combustion engine 11, and with an electric energy supplying system 14 having an electric auxiliary machine 12, and wherein the agricultural production machine 1 has a least one power consumer 6, 8 that is driven by the drive assembly 10.

The "electric auxiliary machine" 12 comprises an electric machine that is coupled or may be drivingly coupled to the driveshaft 16 of the internal combustion engine 11 or a transmission output shaft of a transmission 17 downstream therefrom in order to electrically support the internal combustion engine 11 in the manner of a hybrid system. The internal combustion engine 11 may be supported, such as at least by being driven, by the electric auxiliary machine 12, preferably optionally driven or braked (e.g., the electric auxiliary machine 12 may at least be operated as a motor, such as optionally as a motor or as a generator). The electric energy required in motor mode, or the energy generated in generator mode, is exchanged with the electric energy store 15 by a corresponding electric connection 20.

The internal combustion engine 11 may be operated at a lower rotational speed, such as at the lowest possible rotational speed 21. This lower rotational speed (such as this lowest possible rotational speed 21) may be set for the electric energy supplying system 14 as a target value 22. In turn, in one or some embodiments, the control system 19 is configured to monitor the rotational speed in order to control one or more aspects of the agricultural production machine 1. For example, via the control system 19, electric energy supplying system 14 is configured to support the internal combustion engine 11 by connecting the electric auxiliary machine 12 at this lower rotational speed (such as this lowest possible rotational speed 21) during the connection 23 of a load.

In one or some embodiments, "support" means that the torque generated by the internal combustion engine 11 and the torque generated by the electric auxiliary machine 12 are combined at the lower rotational speed, such as at the lowest possible rotational speed 21.

Setting lower rotational speed, such as the lowest possible rotational speed 21, as a target value 22 means that a target value 22 is set for the rotational speed of the output shaft, such as the crankshaft, of the internal combustion engine 11 for the electric energy supplying system 14, such as a control unit 24 of the electric energy supplying system 14. The electric auxiliary machine 12 then supports the internal combustion engine 11 such that the lower rotational speed, such as the lowest possible rotational speed 21, is kept constant when said load is being connected. The target value 22 may be set for the electric energy supplying system 14 by the user or the control system 19 of the driver assistance system 18.

The embodiment shown in the figures may furthermore provide that the connection 23 of the load is an engagement of the process drive 9b, for example such that the engagement of the process drive 9b may be identified by tightening a drive belt between a driveshaft 16 of the internal combustion engine 11 and the process drive 9b, or by an engagement between a driveshaft 16 of the internal combustion engine 11 and the process drive 9b using a clutch.

The engagement of the process drive 9b means that the process drive 9b disengaged from the drivetrain 13 is coupled to the drivetrain 13 so that a transmission of torque from the driveshaft 16 of the internal combustion engine 11 to the process drive 9b is possible. Engagement using drive belts constitutes a particularly simple version. Engagement by means of a clutch is particularly smooth and therefore also particularly convenient and low-wear.

Moreover, the connection 23 of the load comprises a connection of the drive 9a, the connection 23 of the load is a starting of the agricultural production machine 1, or the connection 23 of the load is an actuation of emptying the grain tank of the agricultural production machine 1.

The connection of the drive 9a, and/or the starting of the agricultural production machine 1, and/or the actuation of emptying the grain tank may occur at least substantially at a lower rotational speed, such as at said lowest possible rotational speed 21.

Moreover, the connection 23 of the load may occur when performing an agricultural work order, such as when processing the headland sequence, or at a standstill with an engaged process drive 9b.

The agricultural work order may comprise a harvesting process, soil cultivation process, fertilization process, etc.

In one or some embodiments, the headland sequence means a proper sequence of work processes when traveling through the headland.

Moreover, the lowest possible rotational speed 21 is at most 1200 rpm, more preferably at most 900 rpm, more preferably at most 700 rpm, preferably at most 650 rpm, more preferably at most 620 rpm.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural production machine
2 Driver
3 Crop
4 Flow of material
5 Feeder housing
6 Power consumer
7 Work assembly
8 Power consumer
9a Drive
9b Process drive
10 Drive assembly
11 Internal combustion engine
12 Electric auxiliary machine
13 Drivetrain
13a First partial drivetrain
13b Second partial drivetrain
13c Third partial drivetrain
14 Electric energy supplying system
15 Electric energy store
16 Driveshaft
17 Transmission downstream in the drivetrain
18 Driver assistance system
19 Control system
20 Electrical connection
21 Lowest possible rotational speed
22 Target value
23 Connection
24 Control unit
25 Processor
26 Memory

The invention claimed is:

1. An agricultural production machine comprising:
a drive assembly comprising a drivetrain with an internal combustion engine and an electric energy supplying system having an electric auxiliary machine; and
a driver assistance system comprising a control system configured to control the internal combustion engine, the electric auxiliary machine and at least one power consumer driven by the drive assembly;
wherein the control system is configured to:
responsive to the internal combustion engine being operated at a designated rotational speed that is lower than an idling speed of the internal combustion engine and responsive to the control system determining an action being or is to be performed indicative of connecting of a load that requires additional power from the drivetrain, controlling operation of the electric auxiliary machine so that the electrical auxiliary machine is connected to the drivetrain in order to at least partly generate a motive force to support the internal combustion engine in operating at least partly when the load is connected.

2. The agricultural production machine of claim 1, wherein, prior to connecting to the load, the internal combustion engine has a current operation;
wherein the control system is configured to operate the internal combustion engine at the the current operation both before and during connecting the load.

3. The agricultural production machine of claim 2, wherein the control system is configured to:
identify connecting the load; and responsive to identifying connecting the load, send a command to control the operation of the electric auxiliary machine in order to connect the electrical auxiliary machine to support the internal combustion engine in operating when connecting the load.

4. The agricultural production machine of claim 3, wherein connecting the load comprises engaging a process drive of the drive assembly.

5. The agricultural production machine of claim 4, wherein the control system is configured to identify connection of the load by detecting a tightening of a drive belt between a driveshaft of the internal combustion engine and the process drive.

6. The agricultural production machine of claim 4, wherein the control system is configured to identify connection of the load by detecting an engagement between a driveshaft the internal combustion engine and the process drive using a clutch.

7. The agricultural production machine of claim 4, wherein the control system is configured to identify connection of the load by detecting at least one of connection of a drive of the drive assembly, a starting of the agricultural production machine, or an actuation of emptying a grain tank of the agricultural production machine.

8. The agricultural production machine of claim 4, wherein the control system is configured to identify connection of the load when the agricultural production machine is not moving but is performing an agricultural work order.

9. The agricultural production machine of claim 4, wherein the control system is configured to identify the connection of the load when the agricultural production machine is performing an agricultural work order in processing a headland sequence.

10. The agricultural production machine of claim 4, further comprising a drive assembly; and
wherein the control system is configured to control the electric auxiliary machine and the drive assembly in order for the internal combustion engine and the electrical auxiliary machine to work together as a hybrid drive system.

11. The agricultural production machine of claim 4, wherein the control system is configured to receive a value indicative of a lowest possible rotational speed; and
wherein the control system, based on the value indicative of the lowest possible rotational speed, is configured to determine whether the internal combustion engine is being operated at the lowest possible rotational speed.

12. The agricultural production machine of claim 4, wherein the electric energy supplying system is configured to receive a value indicative of a lowest possible rotational speed as a target value; and
wherein the lowest possible rotational speed is used as an idling rotational speed for the agricultural production machine.

13. The agricultural production machine of claim 1, wherein the control system is configured to:
determine that there is no load connected;
responsive to determining that there is no load connected, control the internal combustion engine to operate at the designated rotational speed;
identify the connecting of the load; and
responsive to identifying the connecting of the load, control the electrical auxiliary machine in order for the agricultural production machine to use the electrical auxiliary machine when connecting the load.

14. The agricultural production machine of claim 13, wherein, responsive to detecting the action being or is to be performed indicative of connecting the load, the control system is configured to control the electrical auxiliary machine to connect to the drivetrain and to keep the internal combustion engine at the designated rotational speed below the idling speed.

15. The agricultural production machine of claim 13, wherein, responsive to detecting the action being or is to be performed indicative of connecting the load, the control system is configured to control the electrical auxiliary machine to connect to the drivetrain and to keep rotation of the internal combustion engine below the idling speed.

16. The agricultural production machine of claim 1, wherein the action is detected by monitoring at least a part of a driveshaft of the agricultural production machine.

17. The agricultural production machine of claim 1, wherein the action is detected by monitoring an engagement of a process drive of the agricultural production machine.

18. The agricultural production machine of claim 1, wherein the action is detected by monitoring whether a headland sequence is being processed.

* * * * *